Oct. 17, 1939.  W. K. KISE  2,176,082
ELECTRIC COFFEE MAKER
Original Filed Feb. 17, 1937
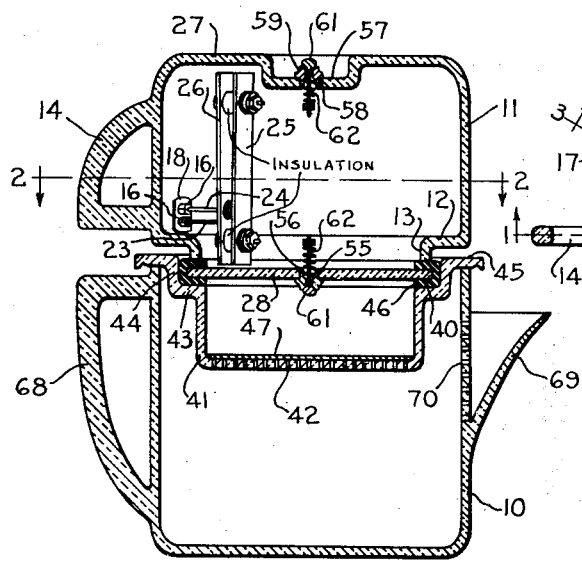
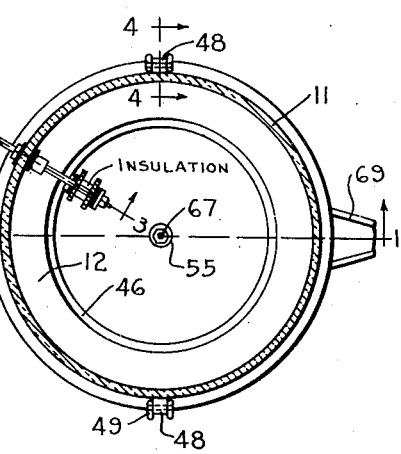
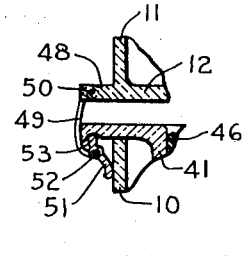
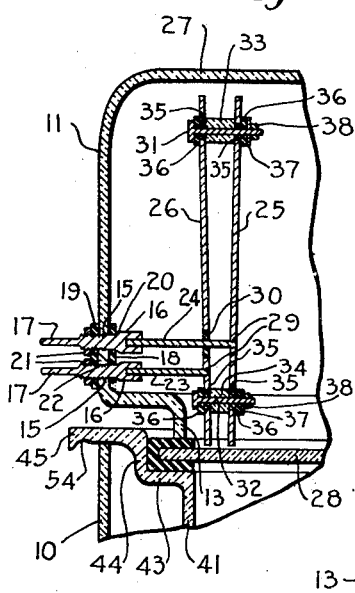
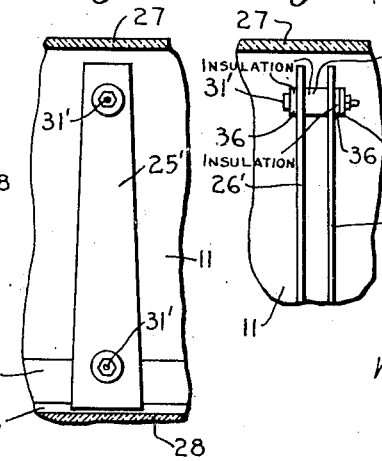
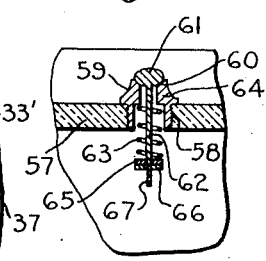
INVENTOR
WILLIAM KENT KISE
BY Alfred R. Fuchs
ATTORNEY Patented Oct. 17, 1939

2,176,082

UNITED STATES PATENT OFFICE 2,176,082

ELECTRIC COFFEE MAKER

William Kent Kise, Kansas City, Mo.

Application February 17, 1937, Serial No. 126,213
Renewed October 3, 1938

14 Claims. (Cl. 219—44)

My invention relates to electric coffee makers, and more particularly to electrical means for brewing coffee that is provided with means whereby the heating and feeding of the water utilized for brewing the coffee is controlled so that only water under the right temperature to obtain coffee of the most desirable flavor will be produced by said device, the water being fed to the coffee under pressure. Scientific experimentation has found that it is necessary to have the water that comes in contact with the ground coffee at a temperature that will extract all of the aroma from the coffee without extracting the undesirable acids and other ingredients that spoil the flavor and produce harmful effects on the coffee drinker. Such a temperature, it has been definitely determined, is a temperature slightly below the boiling point of water, and it is accordingly one of the principal purposes of my invention to provide means for heating water and feeding it to the ground coffee in such a manner, that substantially no water at a temperature too low to extract the desired flavor producing aromatic oils and fragrant ethers will engage with such coffee, and no water at a temperature so high that it will extract the undesirable ingredients from the coffee will contact the coffee, the hot water being supplied to the ground coffee holder under pressure so that the extraction of the flavor producing ingredients from the coffee will be accelerated and increased.

My apparatus is particularly adapted for making what is known as "drip" coffee. The combined heating and feeding means for the hot water comprises a water chamber, or container, that is provided with an opening in the bottom thereof, through which the water is discharged when the same reaches a predetermined desired temperature, the discharge being controlled by means of a pressure responsive valve, which opens at a predetermined pressure, which will be related to the temperature of the water in the water container at the time that such pressure is built up, the container having heating means provided within the same and said container being further provided with means for preventing too high a pressure being built up within the same by the gases and steam, or vapors, formed during the heating of the water, said means comprising a pressure relief valve, which operates to relieve the pressure when the same reaches a maximum that is higher than the pressure at which the valve opens that discharges the heated water into the ground coffee.

It is a particular purpose of my invention to provide heating means within the water container for said water, comprising electrodes that extend substantially in a vertical direction substantially from the top of said container to the bottom thereof so that as the water passes out of the container the heating effect between the electrodes will be decreased, as the same will gradually emerge from the water as the water recedes and the portions thereof projecting out of the water will cease to operate as heating means. However, due to the fact that when the water container is approaching emptiness, or just prior to the passage of the last of the water out of the container into the ground coffee holder, the vapor space in the water container will be proportionately so large compared with the volume of liquid therein, it is desirable to increase the relative heating effect of the electrodes at the lower portion thereof as compared with the heating effect produced by the electrodes at the upper portion thereof. Preferably, this is accomplished by providing a greater flow of current between the electrodes toward the lower ends thereof, and, preferably, these electrodes are so related to each other that the flow of current between the electrodes increases gradually from the upper portions thereof to the lower portions thereof. This may be accomplished by either having the electrodes approach more closely to each other toward their lower ends, or by making the electrodes of larger area at their opposed faces as the same approach their lower ends, as may be desired.

It is a further purpose of my invention to provide an electrical coffee maker that operates on the principle of a "drip" coffee making apparatus, which comprises an upper water container that has electrodes therein for heating the water by electrolysis thereof, and which is provided with an opening at one end thereof through which the water may be introduced into the water container and through which the electrodes may also be inserted and removed, the same being also detachable for cleaning purposes, which water container is inverted when placed into operative position, a closure being provided for the open end of said water container that becomes the bottom wall thereof and which is provided with a valved opening for controlling the discharge of the liquid from the water container, said closure member being sealed to the water container so that said water container, while the valves associated therewith are in closed position, is substantially a liquid tight sealed container. The pressure relief valve previously referred to, is provided in the wall of said container opposite the open end thereof, through which the water is introduced, and both said pressure relief valve and the pressure actuated discharge valve are normally held closed and remain closed until the pressure at which the same open, is reached.

It will be obvious that with a device of this character the current passing between the electrodes will be dependent upon the water surrounding the same, and that when all of the water has been discharged from the water container, the circuit between the electrodes will automatically be opened, stopping the operation of the device automatically.

It is an important purpose of my invention to provide an electric coffee making device that purifies the water that is utilized for making the coffee. The impurities in water are principally constituents that will be precipitated during the electrolysis of the water. During the heating action that is produced by the electrodes the water is agitated and instead of the precipitates settling to the bottom of the container for the water, these will tend to form a scum on the top and will settle along the sides of the container as the water passes out of the same after it has been heated to the proper temperature. As a result practically all of the impurities that have been separated by the electrolysis adhere to the container and do not pass into the ground coffee holding portion of the device. The very small amount of such precipitated material that might pass through the opening in the bottom of the water container will be filtered out by the ground coffee in the coffee container and the filter paper therein.

It is a particular purpose of my invention to provide an electrolytic means for heating the water in a water container for feeding the same to ground coffee in an electric coffee maker, in which the gases from the electrolytic action form quickly as the water expands due to the heating thereof, and some steam forms due to the boiling action of the water in the upper part of the container. The lower valve then opens and permits the hot water from the lower portion of the container, which is at that time still under the boiling point, to pass out of the same and into the coffee holder, or coffee basket, and into engagement with the ground coffee, this being accomplished by the adjustment of the discharge valve so that the same discharges at a pressure such that the water in the lower portion of the container will not have yet reached the boiling point. This is particularly possible because electrolytic means is used for heating the water, as the heating is taking place throughout the water from top to bottom thereof and, as is well known, the hottest water will collect at the top.

It is a further purpose of my invention to provide a device of the above mentioned character in which the discharge valve will open wider due to the gases and steam forming in the top portion of the water container increasing, forcing the hot water into the ground coffee under pressure, extracting the aromatic oils and fragrant ethers and other desirable flavoring ingredients therefrom, the forcing of the hot water under pressure into engagement with the particles of coffee and into the interior of said particles, producing a more complete extraction of the flavoring ingredients of the coffee than if the water only flowed out over the ground coffee.

It is a further purpose of my invention to provide a device of the above mentioned character in which the electrolytic action diminishes as the water recedes from the container, due to the fact that smaller portions of the electrodes are under water, and in which any excessive pressure of the discharging hot water is avoided due to the provision of pressure relief means that operates to hold the pressure in the upper water container below a certain maximum. Thus means is provided for keeping the water that discharges from the container between a certain minimum and maximum pressure and temperature, which is sufficient to get very efficient extraction of the flavors from the ground coffee, and which is not such that the water that passes out of the container will ever reach the boiling point at the discharge outlet into the ground coffee basket, or holder, this being partly due to the fact that the water discharges from the water container into the ground coffee container in a fine spray, causing dissipation of some of the heat in the water and preventing boiling thereof.

One of the important purposes of the invention is to so heat the water and control the discharge thereof from the water container that it will pass therefrom relatively slowly and will pass more slowly through and over the coffee than would be true if the maximum and minimum pressure were not restricted by the discharge valve and the pressure relief valve, as described below.

Other objects and advantages of my invention will appear as the description of the drawing proceeds. I desire to have it understood, however, that I do not intend to limit myself to the particular details shown or described, except as defined in the claims.

In the drawing:

Fig. 1 is a vertical sectional view through my electric coffee making device, taken substantially on the line 1—1 of Fig. 2.

Fig. 2 is a section thereof taken on the line 2—2 of Fig. 1, partly broken away.

Fig. 3 is an enlarged fragmentary vertical sectional view taken on the line 3—3 of Fig. 2.

Fig. 4 is a fragmentary enlarged sectional view taken on the line 4—4 of Fig. 2.

Fig. 5 is a fragmentary elevational view of the clamping means shown in Fig. 4, and adjoining portions of the device.

Fig. 6 is a fragmentary view partly in vertical section and partly in elevation of a modified form of the invention.

Fig. 7 is an enlarged fragmentary sectional view of the upper portion of the apparatus shown in Fig. 1, showing the valve structure, and Fig. 8 is a fragmentary view partly in section and partly in elevation taken substantially perpendicularly to Fig. 6.

Referring in detail to the drawing, my improved electric coffee maker comprises a lower liquid container 10 and an upper liquid container 11, said upper liquid container 11 being the water container for my improved apparatus, in which the water to be utilized in making the coffee is heated. Said water container 11 is provided with an inwardly directed flange portion 12 having a lip portion 13 thereon providing an annular depending flange on said flange, or shoulder, 12, thus providing a normally open end on the container 11, through which water may be introduced into the same, it being understood that at the time water is introduced into the container 11, the same is in a position that is inverted from that shown in Fig. 1 with the open end thereof upwardly, any suitable handle 14 being provided on said container for manipulation thereof, the same being made of insulating material, such as porcelain, glass, or other similar material. The water container 11 is further provided with a pair of openings 15 in the side wall thereof, through which the terminals 16 extend, said terminals 16 terminating in contacts 17 extending outwardly from the side wall of the container 11 and are made of a suitable character for engagement of the terminals of an electric circuit, provided in a suitable plug member, therewith.

Suitable compressible insulating members 18 and 19 are provided on the inner and outer faces of the container 11 adjacent the openings 15 and surrounding said openings, which are adapted to be clamped between the shoulders 20 provided on the terminals 16 and the side wall of the container 11 and the nuts 21 having screw-threaded engagement with the threaded portions 22 of the terminals 16, and the wall of said container 11. The terminals 16 are, preferably, split, as will be evident from Fig. 1, and are of a resilient character so that the same will frictionally grip the terminals 23 and 24 provided on the electrodes 25 and 26, respectively. The electrodes 25 and 26 are made of any suitable metal, or metallic alloy, that will serve as an electrical conductor that is not affected by the electrolytic action, as are also the terminals 23 and 24, and the terminals 16.

It will be noted that the electrodes 25 and 26 are made in the form of bars of substantially uniform thickness and width throughout the length thereof and are of substantially the same length, extending from a point closely adjacent the top wall 27 of the container 11 to the bottom closure 28 thereof. The terminals 23 and 24 may be secured to the electrodes in any desired manner, as by means of threaded end portions engaging the threaded openings 29 in said electrodes, and the terminal 24 extends through an opening in the electrode 26, in which an insulating bushing 30 is mounted to insulate the terminal 24 from the electrode 26. Suitable means is provided for holding the electrodes in properly spaced relation, comprising the headed screw-threaded bolt-like members 31 and 32 and the insulating spacing sleeves 33 and 34. Said bolt-like members pass through enlarged openings in the electrodes 25 and 26, in which insulating washers 35 are mounted to prevent any short circuiting between the electrodes through the securing elements 31 and 32. Insulating washers 36 are also mounted between the electrodes and the heads of the members 31 and 32 and the washers 37 mounted on said bolt-like members 31 and 32, nuts 38 being provided engaging screw-threaded portions of the bolt-like members 31 and 32 for clamping the parts in fixed relationship.

It will be noted that the bolt-like member 31 and the sleeve 33 are, respectively, longer than the bolt-like member 32 and the sleeve 34 so that the electrodes 25 and 26 gradually approach closer together from their upper ends to their lower ends, thus providing for greater passage of current between the electrodes from the upper to the lower ends thereof due to the fact that the resistance of the circuit will be less at the lower ends of the electrodes than at the upper ends thereof, the purpose of this being to obtain a greater heating effect by the passage of current between the lower portions of the electrode per unit thereof than for the upper portions thereof.

The same result can be obtained by providing electrodes, such as the electrodes 25' and 26', which are mounted in a similar manner to the electrodes 25 and 26, said electrodes 25' and 26' being shown in Figs. 6 and 8. However, in this form of the invention the bolt-like members 31' and the sleeves 33' are of the same length at opposite ends of the electrodes, and said electrodes 25' and 26' extend in parallelism to each other. However, it will be noted that said electrodes 25' and 26' are of gradually tapering character, gradually becoming wider from the upper ends to the lower ends thereof to thus provide for a greater flow of current between the same as the distance from the upper ends thereof increases, the faces of said electrodes 25' and 26' that lie opposite each other, increasing in width gradually from said upper ends to said lower ends, thus providing a larger current flow between the same at their lower ends than at their upper ends.

The closure member 28 is adapted to be mounted in an annular recess 40 provided in the upper portion of the ground coffee holder, or basket, 41, which is provided with perforations 42 in the bottom wall thereof. The offset in the wall portion of the coffee holder, or basket, 41 providing the annular recess 40 comprising an outwardly extending wall portion 43 and an upwardly extending wall portion 44 terminating in an outwardly directed annular lateral flange 45. A gasket 46 that is U-shaped in cross section extends around the peripheral edge of the disk-like closure member 28 and is engaged by the peripheral edge of the lip portion 13 when the parts are in the position shown in Fig. 1. While a single gasket U-shaped in cross section is shown, it is obvious that any form of gasket can be used that provides a compressible annular gasket portion between the lip 13 and the plate 28, and a similar gasket portion between the annular outwardly directed shoulder 43 and the plate 28.

In practice, the coffee holder, or basket, 41 is filled with ground coffee to the desired extent, a filter paper 47 having first been placed in the bottom of the coffee basket, or holder, 41 before said ground coffee is inserted therein. After the ground coffee has been placed in the ground coffee holder, or basket, 41 the closure member 28 is placed in position to close the top of said ground coffee holder, as shown in Fig. 1, the gasket 46 being in place around the edge portion of the member 28 at the time it is placed in such position. The water container 11 is then filled in a position inverted from that shown in Fig. 1, whereupon the ground coffee container, in an inverted position from that shown in Fig. 1, is placed on top of the rim, or lip portion, 13 of the container 11.

It will be noted that a plurality of ears 48 is provided on the water container 11 projecting in an opposite direction from the flange 12 and that clamping members comprising the bails 49 are pivoted at 50 in said ears. The U-shaped bail portions 49, as will be evident from Figs. 2, 4 and 5, have the levers 51 pivoted on the transverse portions 52 thereof, said levers 51 having end portions 53 that are adapted to engage in the groove 54 provided on the flange 45 on the lower container 10 and being so proportioned that when the same are in the position shown in Fig. 4, the portion 53 is swung beyond the line connecting the pivots 50 and 52 so that the tendency will be for the levers to be held in the position shown in Fig. 4 until manually swung out of locking position. When in the position shown in Fig. 4 the clamping members comprising the portions 49 and 51 will draw the flange 45 and the ears 48 toward each other, and thus the lip 13 toward the shoulder, or flange, 43 compressing the gasket 46 between the annular rim, or lip portion, 13 and the member 28, and between the ledge 43 and the member 28, providing a liquid tight seal between the container 11, the bottom closure member 28 and the coffee holder, or basket, 41. The member 10 can be placed in inverted position over the member 28 and the parts clamped in liquid tight relation, as described above. The entire apparatus can then be inverted to the position shown in Fig. 1, whereupon the coffee maker is ready to operate. A suitable plug can then be engaged with the terminals 17 and the electrodes 25 and 26 will then function to heat the water in the water container 11.

It will be noted that the bottom forming closure member 28 is provided with an opening 55 in which a valve member 56 is mounted, and that the top wall 27 is provided with a depressed portion 57, which is provided with an opening 58 in which the valve member 59 is mounted. The valve members 56 and 59 are constructed in the same manner, each being provided with a seat portion 60 and a valve 61 engaging said seat portion. Each of said valves is also provided with a stem portion 62 around which the coil spring 63 extends, as will be clear from Fig. 7, one end thereof engaging with a shoulder 64 provided in the body portion of the valve, and the other end thereof engaging in an adjustable stop nut 65, which is held in fixed position by means of the lock nut 66 engaging a threaded portion 67 on the valve stem. Both of the valves open outwardly, the one through the bottom wall of the container and the other through the top wall thereof. However, the valve 56 is adjusted so that the valve portion thereof is not held in engagement with its seat under as great a spring pressure as the valve portion of the valve 59. The adjustment of the valve 56 is made so that it will open when a pressure is generated in the container 11 that is the desired minimum pressure at which the hot water is to be discharged into the coffee holder, or basket, 41, this being such a pressure that the water entering the coffee container, or basket, 41, will be hot but will not be quite up to the boiling point. The valve 59 is, however, so adjusted that it will normally remain closed and will only open when the pressure in the container 11 becomes so great that the water will be forced through the passage in the valve 56 too rapidly for proper operation of the apparatus in extracting the desired ingredients from the coffee in the coffee holder, or basket, 41.

The lower container 10, of course, receives the coffee that passes through the perforations 42 of the coffee container, or basket, 41, the coffee brewed by the apparatus thus passing into the container 10, which is made in any suitable manner, and may be provided with a handle 68 of any desired character, and a spout 69, which is connected with the chamber within the member 10 by means of openings, or perforations, 70 in the wall thereof.

After the electrodes have been connected in an electrical circuit by plugging in the terminal 17 into a suitable plug member, the electrolysis of the water commences. At first the gases formed from the electrolytic action will be produced rapidly and the water will be expanded due to the heating thereof, and also some steam will be formed. This will create a pressure in the upper portion of the container 11, which, of course, is transmitted to the body of water and when this reaches the desired pressure, which will be proportionate to the heating of the water, and will be such due to adjustment of the valve 56 that the water in the bottom part of the container 11 will be just slightly below the boiling point, the valve 56 will open and the hot water will enter the coffee holder, or basket, 41, immersing the ground coffee in the hot water and it will begin to filter through the ground coffee and the filter paper. This will continue and the spring actuated valve 56 will gradually open wider as the pressure due to the gas and steam generated in the electrolysis of the water will increase. The hot water is forced out through the valve 56 under pressure and extracts the aromatic oils and fragrant ethers and other valuable ingredients from the ground coffee. The fact that the hot water is forced into the interior of the particles of coffee due to the pressure under which the water passes into the ground coffee container, or holder, will produce a more complete extraction of the flavoring ingredients of the coffee, than if the water only flowed over the ground coffee. This pressure is maintained due to the seal provided between the ground coffee holder 41 and the container 11, the only place through which the pressure can escape being the filter paper and perforated bottom wall of the coffee container, or holder, 41. As the depth of the water in the container 11 gradually decreases, the amount of electrolysis in the water also decreases, this preventing any overheating and violent boiling of the water in the container and preventing the escape of water through the valve 56 that is at the boiling point. The water in the lower part of the container will, of course, be somewhat cooler than that in the upper part of the container at all times. That is, the hottest portion of the water will be near the top surface of the body of water. Should any of the water that passes through the valve 56 be substantially at the boiling point, it would, however, be cooled below the boiling point because it is sprayed from the valve 56 into the ground coffee in the container, or holder, 41, this cooling the water sufficiently that it will not be at the boiling point when it reaches the coffee. Due to the fact that no water at the boiling point comes in contact with the ground coffee, the possibility of extraction of harmful chemical ingredients from the coffee is eliminated.

As the hot water continues to pass through the lower valve 56 a point is reached where the pressure in the upper container increases, due to the fact that the vapor space in the top of the container 11 is relatively small and the passage of the liquid from the coffee holder 41 is slowed. In order to prevent the excessive increase in this pressure of gases and vapors in the upper, or water, container 11, which of course, is transmitted to the liquid in the coffee holder 41, and which might force the water through the ground coffee at too rapid a rate, the valve 59 opens to relieve this pressure. The valve 59 is set so that this pressure is relieved only when it is built up to a point where it is undesirably great, it being obvious that, if the water in the container 11 is under too great a pressure, the boiling point of the water will be raised to an extent that the water will be too hot when it passes into the container 41 for the ground coffee, as well as causing the too rapid passage of the hot water through the ground coffee. As soon as sufficient of the gases and steam have escaped to bring the pressure back down to the desired amount, the valve closes.

As the level of the water near the bottom of the upper, or water, container 11 is reached, the pressure which has been maintained would begin to drop, due to the fact that so little water remains and such a small part of the electrodes are immersed in the water, while such a large vapor space exists, which must be filled with the vapors and gases produced by the electrolysis. In order to avoid this, the electrodes are either enlarged or placed closer together toward the bottom ends thereof to cause a more energetic electrolytic action at the lower portions thereof than at the upper potrions thereof so that the complete discharge of the water by pressure in the upper container is effected. The flow of electric current through the apparatus is gradually decreased as the water recedes from the electrodes, this continuing until the flow of current is entirely discontinued, when all of the water has passed from the water container into the ground coffee basket, or holder. The coffee making operation is substantially completed at the same time that this occurs.

It will be evident that the container 11 need not be completely filled to successfully operate the electric coffee making apparatus described above. Due to the fact that the electrodes extend substantially vertically, the heating effect on the water will be substantially in proportion to the amount of water that is in the container 11 due to the electrolytic action produced in the body of water by said electrodes. Of course, the electrolytic action will increase gradually in a downward direction between the electrodes because of their spacing, or shape, as the case may be. The exact shape, or spacing, of the electrodes can be varied in accordance with the electrolytic effect desired. Both the approach of the electrodes toward each other and the taper of the electrodes in Figs. 3 and 6, respectively, is somewhat exaggerated to clearly show the same in the drawing. While such a variation in the spacing or in the size of the electrodes might be desirable under certain circumstances, it has been found that a much smaller amount of variation in the electrolytic action is usually found desirable to get the results referred to above. It will be seen from the above that a very simple apparatus, easily manipulated and positive in action is provided, which is usable successfully for the production of drip coffee in any desired quantities up to the full capacity of the water container 11.

What I claim is:

1. In an electric coffee maker, an upper water container having an open lower end, a closure for said open end of said container forming a bottom wall having a discharge outlet therein, a valve opening at a predetermined pressure controlling said outlet, a pressure relief outlet communicating with the upper portion of said water container, a valve for said relief outlet opening at higher pressure than the valve controlling said discharge outlet, a pair of electrodes in said water container extending substantially vertically from near the top thereof to near the bottom thereof, said water container being sealed when both said valves are closed, a perforated ground coffee holder depending from said water container, means providing a liquid tight joint between said coffee holder and said liquid container and a lower coffee receiver into which said coffee holder extends.

2. In an electric coffee maker, an upper water container having an open lower end, a closure for said open end of said container forming a bottom wall having a discharge outlet therein, a valve opening at a predetermined pressure controlling said outlet, a pressure relief outlet leading from the upper portion of said water container, a valve for said relief outlet opening at higher pressure than the valve controlling said discharge outlet, a pair of electrodes in said water container extending substantially vertically from near the top thereof to near the bottom thereof, said water container being sealed when both said valves are closed, a perforated ground coffee holder depending from said water container, means providing a liquid tight joint between said coffee holder and said liquid container and a lower coffee receiver into which said coffee holder extends, said electrodes being so related that the current flow between the same increases from the upper ends thereof toward the lower ends thereof.

3. In an electric coffee maker, an upper water container having an open lower end, a closure for said open end of said container forming a bottom wall having a discharge outlet therein, a valve opening at a predetermined minimum pressure controlling said outlet, a pressure relief outlet leading from the top portion of said water container, a valve for said relief outlet opening at higher pressure than the valve controlling said discharge outlet, a pair of electrodes in said water container extending substantially vertically from near the top thereof to near the bottom thereof, a perforated ground coffee holder, sealing means between said container, said closure and said ground coffee holder, means for clamping said container, closure and ground coffee holder in liquid tight engagement, said water container being sealed from the atmosphere when both said valves are seated and a lower coffee receiver into which said ground coffee holder extends.

4. In an electric coffee maker, an upper water container having an open lower end, a closure for said open end of said container forming a bottom wall having a discharge outlet therein, a valve opening at a predetermined minimum pressure controlling said outlet, a pressure relief outlet leading from the top portion of said water container, a valve for said relief outlet opening at higher pressure than the valve controlling said discharge outlet, a pair of electrodes in said water container extending substantially vertically from near the top thereof to near the bottom thereof, means for detachably mounting said electrodes in said container, said water container being sealed from the atmosphere when said valves are in closing position, a perforated ground coffee holder depending from said water container, means providing a liquid tight joint between said coffee holder and said liquid container and a lower coffee receiver into which said coffee holder extends.

5. In an electric coffee maker, an upper water container having an open lower end, a closure for said open end of said container forming a bottom wall having a discharge outlet therein, a valve opening at a predetermined minimum pressure controlling said outlet, a pressure relief outlet leading from the upper portion of said water container, a valve for said relief outlet opening at higher pressure than the valve controlling said discharge outlet, a pair of electrodes in said water container extending substantially vertically from near the top thereof to near the bottom thereof, a perforated ground coffee holder depending from said water container, said water container being sealed from the atmosphere when said valves are in closing position, means providing a liquid tight joint between said coffee holder and said liquid container and a lower coffee receiver into which said coffee holder extends, said electrodes gradually approaching into closer proximity to each other toward the lower ends thereof.

6. In an electric coffee maker, an upper water container having an open lower end, a closure for said open end of said container forming a bottom wall having a discharge outlet therein, a valve opening at a predetermined minimum pressure controlling said outlet, a pressure relief outlet leading from the upper portion of said water container, a valve for said relief outlet opening at higher pressure than the valve controlling said discharge outlet, a pair of electrodes in said water container extending substantially vertically from near the top thereof to near the bottom thereof, a perforated ground coffee holder depending from said water container, said water container being sealed from the atmosphere when said valves are in closing position, means providing a liquid tight joint between said coffee holder and said liquid container and a lower coffee receiver into which said coffee holder extends, the faces of said electrodes opposite each other gradually widening toward the lower ends thereof.

7. In an electric coffee maker, an upper water container having an open lower end through which the same is adapted to be filled, a ground coffee container having an open end, a common closure member for said coffee container and said water container, means for securing said water container, closure member and coffee container together in liquid tight engagement, said closure forming the bottom wall of said coffee container upon inversion thereof, said closure having a valved outlet therein opening at a predetermined minimum pressure, a pressure relief valve leading from the upper portion of said water container opening at a higher pressure than the valve controlling said bottom outlet, a pair of vertically elongated electrodes in said water container, said water container being sealed from the atmosphere when said valves are in closing position, and a lower coffee receiver into which said ground coffee container extends.

8. In an electric coffee maker, an upper normally sealed water container, a pair of electrodes therein, a perforated ground coffee container, pressure actuated means for discharging the water from said water container into said coffee container at a predetermined minimum pressure, pressure actuated means limiting the pressure in said water container to a predetermined maximum and a lower coffee receiver.

9. In an electric coffee maker, an upper water container, a pair of electrodes therein, a perforated ground coffee container, pressure actuated means for discharging the water from said water container into said coffee container at a pressure between a predetermined minimum and maximum, said electrodes being elongated and extending substantially vertically in said water container, said electrodes being so related that the current flow between the same increases from the upper ends thereof toward the lower ends thereof, and a lower coffee receiver.

10. In an electric coffee maker, an upper water container, a pair of electrodes therein, a perforated ground coffee container, pressure actuated means for discharging the water from said water container into said coffee container at a pressure between a predetermined minimum and maximum, said electrodes being elongated and extending substantially vertically in said water container, said electrodes gradually approaching into closer proximity to each other toward the lower ends thereof, and a lower coffee receiver.

11. In an electric coffee maker, an upper water container, a pair of electrodes therein, a perforated ground coffee container, pressure actuated means for discharging the water from said water container into said coffee container at a pressure between a predetermined minimum and maximum, said electrodes being elongated and extending substantially vertically in said water container, the faces of said electrodes opposite each other gradually widening toward the lower ends thereof, and a lower coffee receiver.

12. In an electric coffee maker, an upper water container, electrical heating means in said water container mounted to heat the water therein until said container is substantially emptied, a lower coffee receiver, a ground coffee holder between said water container and coffee receiver, an outlet for discharging water from said water container into said ground coffee receiver, and means controlling the temperature and rate of discharge of the water from said outlet, comprising means sealing said container until a predetermined pressure is built up therein, said means comprising a pair of valves cooperating to maintain said pressure between a predetermined maximum and minimum.

13. The method of making coffee, comprising heating a predetermined quantity of water in a sealed container, discharging said water after the same has reached a predetermined temperature at a predetermined pressure between a predetermined minimum and maximum gradually from the container onto a body of ground coffee, and heating the water in said container to maintain said pressure and temperature during the discharge of the water onto said ground coffee.

14. In an electric coffee maker, an upper water container, electrical heating means in said water container mounted to heat the water therein until said container is substantially emptied, a lower coffee receiver, a ground coffee holder between said water container and coffee receiver, an outlet for discharging water from said water container into said ground coffee receiver, and means controlling the temperature and rate of discharge of the water from said outlet, comprising means for building up and maintaining a predetermined pressure therein comprising a pressure responsive water discharge valve for said outlet and a pressure relief outlet communicating with the upper portion of said water container.

WILLIAM KENT KISE.